(12) United States Patent
Leino et al.

(10) Patent No.: US 6,355,819 B1
(45) Date of Patent: Mar. 12, 2002

(54) SUBSTITUTED METALLOCENE COMPOUNDS FOR OLEFIN POLYMERIZATION CATALYST SYSTEMS, THEIR INTERMEDIATES AND METHODS FOR PREPARING THEM

(75) Inventors: Reko Leino, Turku; Hendrik Luttikhedde, Nousiainen; Carl-Eric Wilen, Åbo; Jan Näsman, Turku; Kalle Kallio, Vanhakylä; Hilkka Knuuttila, Porvoo; Jyrki Kauhanen, Helsinki, all of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/402,934

(22) PCT Filed: Jan. 27, 1998

(86) PCT No.: PCT/FI98/00075

§ 371 Date: Dec. 20, 1999

§ 102(e) Date: Dec. 20, 1999

(87) PCT Pub. No.: WO98/46616

PCT Pub. Date: Oct. 22, 1998

(30) Foreign Application Priority Data

Apr. 14, 1997 (FI) .................................................. 971565

(51) Int. Cl.[7] .............................. C07F 17/00; C08F 4/44; B01J 31/00

(52) U.S. Cl. .............................. 556/11; 556/12; 556/28; 502/103; 502/117; 502/120; 526/160; 526/943; 526/351

(58) Field of Search .............................. 556/11, 12, 28; 502/103, 117, 120; 526/160, 943

(56) References Cited

U.S. PATENT DOCUMENTS 5,504,232 A  * 4/1996  Winter et al. ............... 556/7

FOREIGN PATENT DOCUMENTS

| EP | 0582195 | 2/1994 |
|---|---|---|
| EP | 0670325 | 9/1995 |
| FI | 960437 | 1/1996 |
| FI | 970349 | 1/1997 |
| WO | 9314132 | 7/1993 |
| WO | 94 11406 | 5/1994 |
| WO | 97 28170 | 8/1997 |

OTHER PUBLICATIONS

Journal of Organometallic Chemistry 520 (1996) 63–68 Barsties et al "ansa–Metallocene derivatives XXXIII . . . ".
Journal of Organometallic Chemistry 519 (1996) 269–272 Plenio et al "Aminozirconocenes: a new class of . . . ".
Organometallics 15 (1996) 3092–3094 Luttikhedde et al "(2–(Dimethylamino) indenyl) zirconium dichlorides".
Organometallics 13 (1994) 954–963 Spaleck et al "The influence of aromatic substituents on the polymerization . . .".
Organometallics 13 (1994) 964–970 Stehling et al "ansa–ansa–Zirconocene polymerization catalysts with . . . ".
Organometallics 11 (1992) 2115–2122 Lee et al "Electronic effects in Ziegler–Natta polymerization of propylene . . . ".
Organometallics 9 (1990) 3098–3105 Piccolrovazzi et al "Electronic effects in homogeneous indenylzirconium . . . ".
Herbert Plenio et al., Journal of Organometallic Chemistry 544 (1997) 133–137.
Reko Leino et al., Organometallics 1996, 15, pp. 2450–2453.

* cited by examiner

*Primary Examiner*—Porfirio Nazario-Gonzalez
(74) *Attorney, Agent, or Firm*—Birch, Stewart, Kolasch & Birch, LL

(57) ABSTRACT

The invention relates to metallocene compounds having the formula (I):

$(CpY_q)_mMR_nB_o$ (I)

wherein: Cp or each same or different Cp is a non-substituted or substituted, fused or non-fused, homo(iso)cyclic or heterocyclic cyclopentadienyl ligand, indenyl ligand, tetrahydroindenyl ligand, fluorenyl ligand or octahydrofluorenyl ligand, Y or each same or different Y is a substituent at the cyclopentadienyl ring of said ligand Cp having the following structure (II):

$$-O-\underset{\underset{R^3}{|}}{\overset{\overset{R^1}{|}}{D}}-R^2 \quad (II)$$

wherein: D is an element of Group 14 of the Periodic Table (IUPAC), $R^1$, $R^2$ and $R^3$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; M is a transition metal of Group 4 of the Periodic Table (IUPAC) and is bound to the ligand Cp or ligands Cp in an $\eta^5$ bonding mode; R or each same or different R is bound to M and is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or two R form together with M a $C_4$–$C_{20}$ metallocyclic ring structure; B is a bridge atom or group between two Cp ligands or between one Cp ligand and M; q is, when Cp is non-bridged, 0–5 for the cyclopentadienyl ligand, 0–3 for the indenyl or tetrahydroindenyl ligand and 0–1 for the fluorenyl or octahydrofluorenyl ligand, q is, when Cp is bridged, 0–4 for the cyclopentadienyl ligand, 0–2 for the indenyl or tetrahydroindenyl ligand and 0 for the fluorenyl or octahydrofluorenyl ligand; m is 1 or 2; $m \cdot q \geq 1$; o is 0 or 1; and n is 4-m-o, except when there is one bridge B between two Cp ligands, in which case n is 4-m, their intermediates, preparation and use.

48 Claims, 1 Drawing Sheet

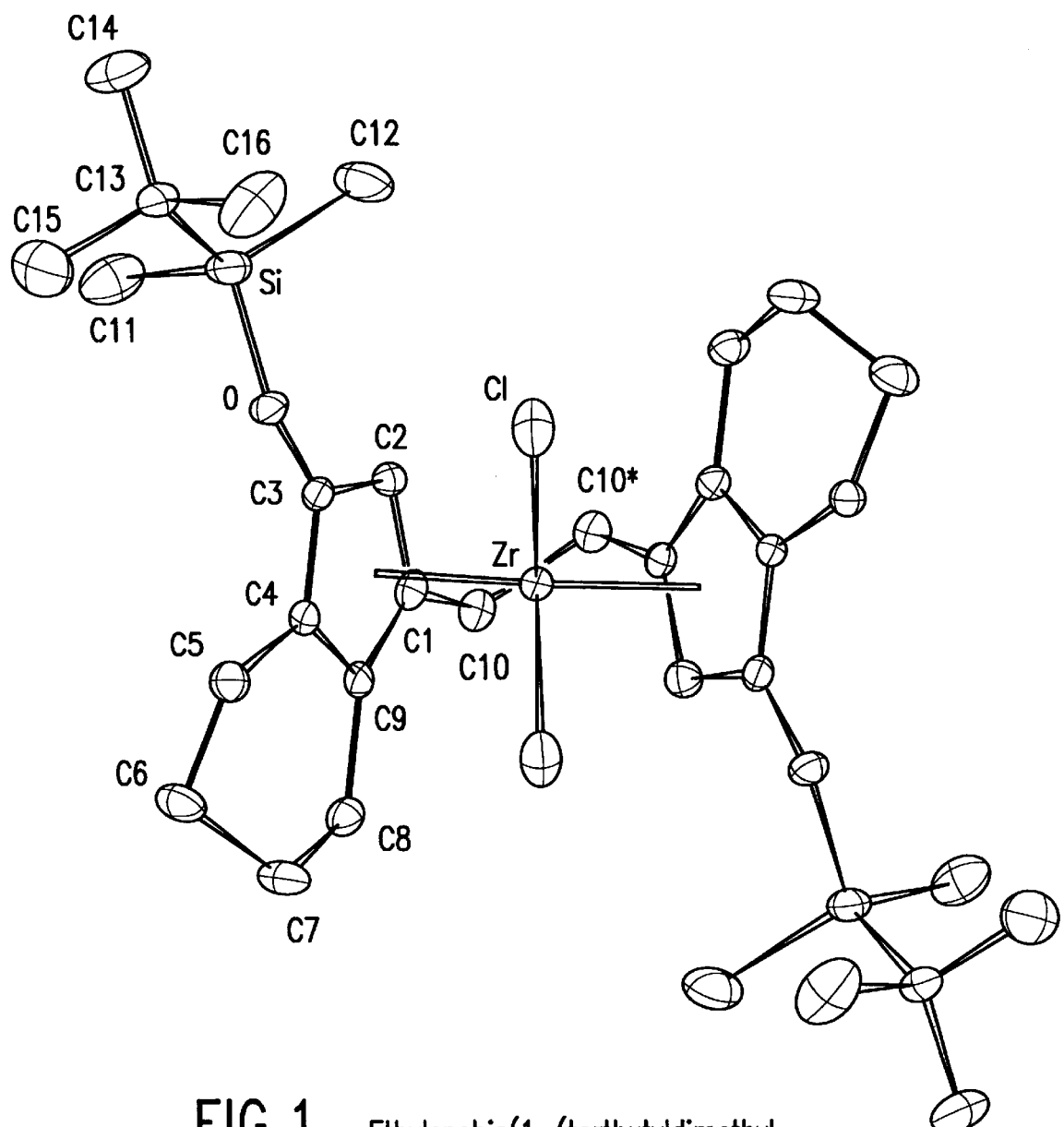
FIG. 1  Ethylenebis(1-(tertbutyldimethyl (siloxy)(4,5,6,7-tetrahydroindenyl) zirconium dichloride

SUBSTITUTED METALLOCENE COMPOUNDS FOR OLEFIN POLYMERIZATION CATALYST SYSTEMS, THEIR INTERMEDIATES AND METHODS FOR PREPARING THEM

This application is the national phase under 35 U.S.C. §371 of PCT International Application No. PCT/FI98/00075 which has an International filing date of Jan. 27, 1998, which designated the United States of America.

The present invention relates to novel metallocene compounds, their intermediates and their preparation. Specifically the invention relates to transition metal metallocenes with heteroatom 1- or 3-substituted indenyl and indenyl derivative ligands and a method for their preparation. The invention also relates to 1- or 3-substituted indene compounds as intermediates for the metallocene compounds and their preparation. Further, the invention relates to the use of said metallocenes in catalyst systems for the homo- and copolymerization of ethylenically unsaturated monomers, preferably olefins, more specifically propylene, ethylene and higher alphaolefins, especially in the presence of a cocatalyst, such as methylaluminoxane (MAO).

Chiral $C_2$ symmetric bis(indenyl) ansa-metallocenes are well-known catalyst components for stereoselective polymerization of alpha-olefins. The performance characteristics of these systems are different, the variations being induced by size and position of the substituents. E.g., dimethylsilylene bridged 2,2'-dimethyl-4,4'-diaryl substituted bis(indenyl) zirconocenes developed by Brintzinger and coworkers (Organometallics 1994, 13, 964) and Spaleck et al. (Organometallics 1994, 13, 954), produce isotactic polypropylenes with catalyst activities and polymer properties comparable to those obtained with heterogeneous Ziegler-Natta catalysts.

The area of electronically altered bis(indenyl) metallocenes has remained relatively unexplored. Previously, it has been reported that halogen or alkoxy substitution in the six-membered rings of indenes reduces the activity of the catalyst system and the molecular weight of the produced polymer (Consiglio et al, Organometallics 1990, 9, 3098; Collins et al., Organometallics 1992, 11, 2115). Bis(indenyl) zirconocenes with 2-amino functionalized ligands have been reported recently by several groups (Luttikhedde et al., Organometallics 1996, 15, 3092; Plenio and Burth, J. Organomet. Chem. 1996, 519, 269; Brintzinger et al., J. Organomet. Chem. 1996, 520, 63). The bridged complexes show somewhat lower catalytic activities compared with their unsubstituted bis(indenyl) zirconocene analogues.

It has now been found however that metallocenes in which a bulky electron withdrawing or donating group is attached to the five membered ring of an indenyl or indenyloid (ie. indenyl analog) ligand have particularly interesting properties, in particular in terms of catalytic activity when used with an alumoxane cocatalyst in propylene and ethylene polymerization.

Thus viewed from one aspect the invention provides a metallocene having a sandwich bonding having ligand comprising a sandwich bonding moiety, having an unsaturated 5-membered ring or a 6-membered ring fused to an unsaturated 5-membered ring, which is covalently substituted by a pendant group containing at least two atoms other than hydrogen and attached via an atom other than a methylene carbon, preferably attached via an oxygen, sulphur, nitrogen or phosphorus atom or via a carbon—carbon multiply bonded carbon atom, eg. a group as described below or in FI 970349 the contents of which are incorporated herein by reference. The sandwich bonded metal in the metallocene is preferably a Group 4 transition metal, particularly Zr, Hf or Ti, most preferably Zr. Other catalytically effective metals however may be used.

By pendant it is meant that the bulky substituent is not attached to a second group which sandwich bonds the metal of the metallocene.

The requirement that the group contains at least two non-hydrogen atoms simply specifies a minimum bulk for the required bulky substituent. Thus halogens and unsubstituted hydroxyl and amine groups are excluded for example. Preferably the substituent contains up to 32 non-hydrogen atoms. The requirement that the group be attached other than via a methylene carbon indicates that the substituent will interact with the electron system of the five membered ring. Suitable means of attachment include oxygen, sulphur, nitrogen and phosphorus atoms and II-bonded carbon atoms. Oxygen attachment is preferred. The attachment atom preferably carries at least one bulky substituent, eg. a $C_{1-20}$ hydrocarbyl group, or more preferably a silyl group or a germyl group, with the silicon or germanium atoms themselves optionally being substituted by $C_{1-20}$ hydrocarbyl or hydrocarbyloxy groups.

The fused 5 and 6-membered rings in the sandwich bonding ligand may be homocyclic (carbocyclic) or heterocyclic, for example containing up to 4 ring heteroatoms selected from O, N and S. The four atom bridge portion of the six membered ring may be unsaturated or saturated. Both the 5 and 6-membered ring may carry other homo- or heterocyclic fused rings. The bulky substituent may be at the 1, 2 or 3 position of the 5-membered ring, eg. the 1- or 3-positions. Particularly preferably the ligand contains two such fused 5/6 member ring systems linked via a bridging atom or group (eg. an ethylene bis indenyl ligand).

In the case where the bulky substituent is a silyloxy or germyloxy group, it is possible for this to be on the 6-membered rather than the 5-membered ring. This represents a further aspect of the invention. Viewed from this aspect the invention provides a metallocene catalyst precursor having a sandwich bonding ligand which comprises a sandwich bonding moiety having an unsaturated 5-membered ring or having a 6-membered ring fused to an unsaturated 5-membered ring, said moiety being substituted on the fused ring structure by a silyloxy or germyloxy group, eg. at the 1, 3, 4, 5, 6 or 7 positions. Germanium atom is further substituted by a $C_{1-20}$ hydrocarbyl or hydrocarbyloxy group.

These ligands themselves are novel and form a further aspect of the invention. Viewed from this aspect the invention provides a sandwich bonding ligand precursor comprising a moiety having a 6-membered ring fused to an unsaturated 5-membered ring, said moiety being substituted on the fused ring structure by a silyloxy or germyloxy group.

The polymerization activity of the metallocene precursors of the invention is such that it is possible to use as a cocatalyst higher alkyl alumoxanes than the conventionally used methyl alumoxane (MAO). By a higher alkyl alumoxane is meant one containing alkyl groups containing 2 or more, eg. 2–10, carbons. This is highly advantageous since the higher alumoxanes are better characterised than MAO which appears to be a mixture of various compounds.

Thus viewed from a further aspect the invention provides a catalyst system comprising or produced by the reaction of a metallocene catalyst precursor according to the invention and an alkyl alumoxane comprising alkyl groups containing at least two carbon atoms, preferably a heterogeneous catalyst system further comprising a support material.

Viewed from a still further aspect the invention provides a method for the preparation of a heterogeneous catalyst system, said method comprising contacting a porous solid (eg. particulate) support, preferably an inorganic support such as silica or alumina, with (i) a higher alkyl alumoxane and a metallocene according to the invention or with the reaction product of a higher alkyl alumoxane and a metallocene according to the invention, and optionally (ii) an organometallic metallocene-activator.

In this method, an activator (optional component (ii)) will be used if the metallocene used requires activation, eg. where it does not contain any alkyl ligands. In this regard, the process described in FI 970349 and analogous processes are applicable.

Viewed from a yet still further aspect the invention provides a process for the catalysed polymerization of an olefin, wherein as catalyst is used a metallocene and a cocatalyst (preferably an alumoxane, especially preferably a higher alkyl alumoxane), or the reaction product of a metallocene and an alumoxane, the improvement comprising using as said catalyst a said cocatalyst and a metallocene according to the invention or a reaction product thereof.

The invention will now be described in more detail using as illustrative members of the metallocenes according to the invention those in which the sandwich bonding ligand is a silyloxy or gemyloxy indenyl (or indenyloid) ligand.

Thus the present invention concerns novel metallocene compounds, substantially characterized by the formula (I):

$$(CpY_q)_m MR_n B_o \quad (I)$$

wherein: Cp or each same or different Cp is a non-substituted or substituted, fused or non-fused, homo(iso)cyclic or heterocyclic cyclopentadienyl ligand, indenyl ligand, tetrahydroindenyl ligand, fluorenyl ligand or octahydrofluorenyl ligand, Y or each same or different Y is a substituent at the cyclopentadienyl ring of said ligand Cp having the following structure (II):

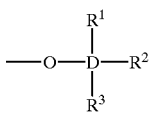

(II)

wherein: D is an element of Group 14 of the Periodic Table (IUPAC), $R^1$, $R^2$ and $R^3$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; M is a transition metal of Group 4 of the Periodic Table (IUPAC) and is bound to the ligand Cp or ligands Cp in an $\eta^5$ bonding mode; R or each same or different R is bound to M and is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or two R form together with M a $C_4$–$C_{20}$ metallocyclic ring structure: B is a bridge atom or group between two Cp ligands or between one Cp ligand and M; q is, when Cp is non-bridged, 0–5 for the cyclopentadienyl ligand, 0–3 for the indenyl or tetrahydroindenyl ligand and 0–1 for the fluorenyl or octahydrofluorenyl ligand, q is, when Cp is bridged, 0–4 for the cyclopentadienyl ligand, 0–2 for the indenyl or tetrahydroindenyl ligand and 0 for the fluorenyl or octahydrofluorenyl ligand; m is 1 or 2; m·q≧1; o is 0 or 1; and n is 4-m-o, except when there is one bridge B between two Cp ligands, in which case n is 4-m.

The ligand Cp or each of the ligands Cp of the metallocene compound of formula (1) is preferably a mono- or polysubstituted, non-fused, homocyclic indenyl or tetrahydroindenyl ligand.

The substituent Y or each of the substituents Y preferably has the above structure (II), wherein D is silicon or germanium, preferably silicon. Preferably, but independently, the substituent Y or each of the substituents Y has the above structure (II), wherein $R^1$, $R^2$ and $R^3$ are the same or different and are each an unsubstituted $C_1$–$C_{10}$ hydrocarbyl group, preferably wherein two of $R^1$, $R^2$ and $R^3$ are linear $C_1$–$C_4$ alkyl groups such as a methyl group and one of $R^1$, $R^2$ and $R^3$ is a branched $C_3$–$C_{10}$ alkyl group such as an isopropyl group, a tert-butyl group or a thexyl group, a $C_5$–$C_8$ cycloalkyl group such as a cyclohexyl group, or a $C_6$ aryl group such as a phenyl group. According to another embodiment, all three groups $R^1$–$R^3$ are branched $C_3$–$C_{10}$-alkyls, such as isopropyl groups.

In the metallocene according to the present invention, the transition metal M of formula (I) preferably is zirconium. In the above formula (I) the group or groups R are bound to the transition metal M. R, or each R independently is one of an unsubstituted $C_1$–$C_4$ alkyl group, preferably a methyl group, or a halogen, preferably chlorine.

According to one embodiment of the invention B is a bridge atom or group between two Cp ligands, preferably a substituted or unsubstituted $C_1$–$C_{10}$ alkylene, a $C_2$–$C_8$ silylene or a $C_1$–$C_{10}$ alkylene-$C_2$–$C_8$ silylene, and most preferably ethylene or dimethylsilylene. According to another embodiment of the invention, B is a bridge atom or group between one Cp ligand and M, preferably a bridge of the structure —(ER'$_2$)$_p$—Z—, wherein each E is independently a carbon, a silicon or a germanium, Z is —NR"—, —PR"—, —O— or —S—, most preferably —NR"—, each R' being independently a hydrogen, each R' and R" being independently a substituted or unsubstituted $C_1$–$C_{10}$ hydrocarbyl, said —(ER'$_2$)-end preferably being bound to Cp and said —Z-end being bound to M. Compound having such bridges, but lacking the structure (II), are disclosed e.g. in WO 93/14132, p. 2, 1. 20–p. 6, 1. 17, herewith included by reference to define said bridge B.

The metallocene compound according to the invention preferably does not have a group CpY$_q$ wherein Cp is an indenyl or tetrahydroindenyl ligand monosubstituted (q=1) by Y at its 2-position, the D of Y being silicon or germanium; except when it has a second group CpY$_{q'}$, wherein Cp is an unsubstituted ligand (q=0) bridged by B to said first group CpY$_{q'}$.

The Cp of the metallocene according to formula (I) is preferably an indenyl or tetrahydroindenyl ligand substituted by Y in at least its 1- or 3-position. The numbering 1 or 3 depends on the substituent Y and the bridge B. If Y is bound to Cp alone or with a higher atom than B, then Y is in the 1-position. If Y is bound to Cp with a lower atom than B, then Y is in the 3-position. More preferably the metallocene has the formula (IIIa) or (IIIb):

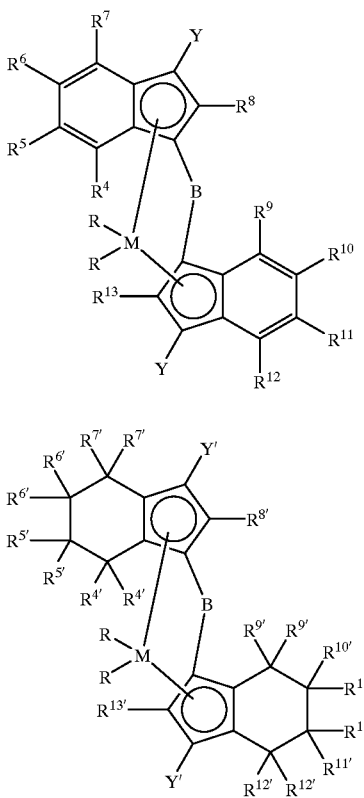

wherein: each Y is the same as above, each Y' is as defined for Y; $R^4, R^5, R^6, R^7, R^9, R^{10}, R^{11}, R^{12}, R^{4'}, R^{5'}, R^{6'}, R^{7'}, R^{9'}, R^{10'}, R^{11'}, R^{12'}$ are the same or different and are each one of a hydrogen a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ or $R^9$–$R^{12}$ in formula (IIIa) may form at least one aromatic $C_6$ ring, at least two groups of $R^4$–$R^7$ or $R^9$–$R^{12}$ in formula (IIIa) may form at least one aliphatic $C_5$–$C_8$ ring, one pair of equally numbered groups and another adjacent pair of equally numbered groups of $R^{4'}$–$R^{7'}$ or $R^{9'}$–$R^{12'}$ in formula (IIIb) may form an aromatic $C_6$ ring, or at least two groups of $R^{4'}$–$R^{7'}$ or $R^{9'}$–$R^{12'}$ in formula (IIIb) may form at least one aliphatic $C_5$–$C_8$ ring, $R^8, R^{13}, R^{8'}$ and $R^{13'}$ are the same or different and are each one of a hydrogen atom, a halogen atom, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or the group Y; N is the same as above in formula (I), M' is as defined for M; B is a bridge between two Cp ligands as defined above in formula (I), B' is as defined for B; each R is the same as above in formula (I) and each R' is as defined for R.

Particularly preferred bridged 1- or 3-(siloxy)indenyl and 1- or 3-(siloxy)-4,5,6,7-tetrahydroindenyl metallocenes according to the present invention include: rac- and meso-[ethylenebis(1-(tert-butyldimethylsiloxy)indenyl)]zirconium dichloride; rac- and meso-[dimethylsilylenebis(3-(tert-butyldimethylsiloxy)indenyl)]zirconium dichloride; rac- and meso-[ethylenebis(1-(thexyldimethylsiloxy)indenyl)]zirconium dichloride; rac- and meso-[dimethylsilylenebis(3-(thexyldimethylsiloxy)indenyl)]zirconium dichloride; rac- and meso-[ethylenebis(1-(tert-butyldimethylsiloxy)-4,5,6,7-tetrahydroindenyl)]zirconium dichloride; rac- and meso-[dimethylsilylenebis(3-(tert-butyldimethylsiloxy)-4,5,6,7-tetrahydroindenyl)]zirconium dichloride; rac- and meso-[ethylenebis(1-(thexyldimethylsiloxy)-4,5,6,7-tetrahydroindenyl)]zirconium dichloride and rac- and meso-[dimethylsilylenebis(3-(thexyldimethylsiloxy)-4,5,6,7-tetrahydroindenyl)]zirconium dichloride; and the same hafnium compounds such as: rac- and meso-[ethylenebis(1-(tert-butyldimethylsiloxy)indenyl)]hafnium dichloride; rac- and meso-[dimethylsilylenebis(3-(tert-butyldimethylsiloxy)indenyl)]hafnium dichloride; rac- and meso-[ethylenebis(1-(thexyldimethylsiloxy)indenyl)]hafnium dichloride; rac- and meso-[dimethylsilylenebis(3-(thexyldimethylsiloxy)indenyl)]hafnium dichloride; rac- and meso-[ethylenebis(1-(tert-butyldimethylsiloxy)-4,5,6,7-tetrahydroindenyl)]hafnium dichloride; rac- and meso-[dimethylsilylenebis(3-(tert-butyldimethylsiloxy)-4,5,6,7-tetrahydroindenyl)]hafnium dichloride; rac- and meso-[ethylenebis(1-(thexyldimethylsiloxy)-4,5,6,7-tetrahydroindenyl)]hafnium dichloride and rac- and meso-[dimethlylsilylenebis(3-(thexyldimethylsiloxy)-4,5,6,7-tetrahydroindenyl)]hafnium dichloride; and the like.

A preferred metallocene compound according to the invention is an [ethylenebis(1-(tert-butylmethylsiloxy)indenyl)]zirconium dichloride which is racemic and has the formula (IVa), meso and has the formula (IVb), or is a mixture of a racemic compound having the formula (IVa) and a meso form compound having the formula (IVb):

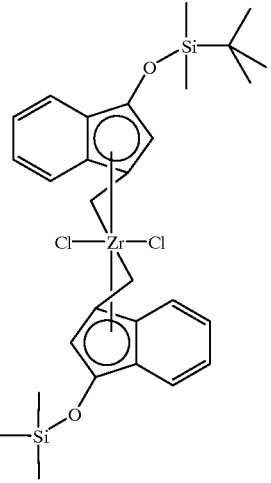

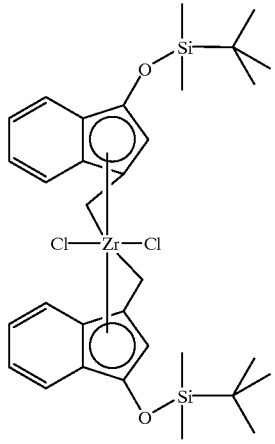

wherein — is methyl —CH$_3$ and

is tert.-butyl —C(CH$_3$)$_3$.

The invention also includes bridged metallocene complexes according to formula (I), M, R and B are as above in formula (I), and CpY$_q$ is a substituted (q>0) or unsubstituted (q=0) cyclopentadienyl group, substituted (q>0) or unsubstituted (q=0) indenyl or tetrahydroindenyl group or substituted (q>0) or unsubstituted (q=0) fluorenyl or octahydrofluorenyl group. An Y-substituted CpY$_q$ ligand is connected to a CpY$_q$ ligand unsubstituted by Y (q=0) by the bridge B to give a bridged (cyclopentadienyl)(1- or 3-siloxyindenyl) ligand, a bridged (indenyl)(1- or 3-siloxyindenyl) ligand or a bridged (fluorenyl)(1- or 3-siloxyindenyl) ligand having the formula (V) or a bridged (cyclopentadienyl)(1- or 3-siloxy-4,5,6,7-tetrahydro indenyl) ligand, a bridged (indenyl)(1- or 3-siloxy-4,5,6,7-tetrahydroindenyl) ligand or a bridged (fluorenyl)(1- or 3-siloxy-4,5,6,7-tetrahydroindenyl) ligand having the formula (VI):

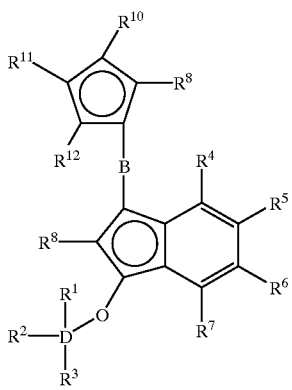

(V)

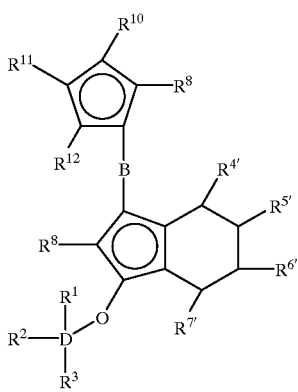

(VI)

Wherein D and R$^1$–R$^{12}$ and B and R$^{4'}$–R$^{7'}$ are the same as in formulas (IIIa) and Preferably R$^1$, R$^2$, R$^3$, R$^4$, R$^5$, R$^6$, R$^7$, R$^{4'}$, R$^{5'}$, R$^{6'}$, R$^{7'}$, R$^8$, R$^9$, R$^{10}$, R$^{11}$ and R$^{12}$ are independently hydrogen or hydrocarbyl substituents. R$_9$ and R$_{10}$ may be parts of a ring structure to form an indenyl type ligand or a fluorenyl type ligand, likewise R$^{10}$ and R$^{11}$ may be parts of a ring structure to form an indenyl type ligand and R$^{11}$ and R$^{12}$ may be parts of a ring structure to form an indenyl type ligand or a fluorenyl type ligand. D is preferably silicon. R$^1$ and R$^2$ are preferably alkyl or aryl substituents and R$^3$ is preferably an alkyl substituent. Preferred bridge B is a C$_1$ or C$_2$ alkylene or a C$_7$–C$_8$ arylalkylene radical or a C$_1$–C$_8$ organic silicon radical. If B is an alkylene or arylalkylene radical, the metallocene is 1-siloxy substituted. If B is a silylene radical, the metallocene is 3-substituted. Particularly preferred bridged (cyclopentadienyl)(1- or 3-(siloxy)indenyl) and (cyclopentadienyl)(1- or 3-(siloxy)-4,5,6,7-tetrahydroindenyl) ligands include 2-(cyclopentadienyl)-2-(1- or 3-(siloxy)indenyl)propane and 2-(cyclopentadienyl)-2-(1- or 3-(siloxy)-4,5,6,7-tetrahydroindenyl)propane ligands; and the like.

Preferred bridged (cyclopentadienyl)(1- or 3-(siloxy) indenyl) and (cyclopentadienyl)(1- or 3-(siloxy)-4,5,6,7-tetrahydroindenyl) metallocenes according to the present invention also include: isopropylidene[(cyclopentadienyl) (1-(siloxy)indenyl)]zirconium dichloride and isopropylidene[(cyclopentadienyl)(1-(siloxy)-4,5,6,7-tetrahydroindenyl)]zirconium dichloride.

The invention also includes novel unbridged metallocene catalysts having the formula (VII):

(VII)

Wherein CpY$_q$ and R are as above. R' is defined for R and Cp'Y' is as defined for CpY. Preferably CpY$_q$ and Cp'Y'$_q$ are substituted indenyl ligands having the formula (VIII) or substituted tetrahydroindenyl ligands having the formula (IX):

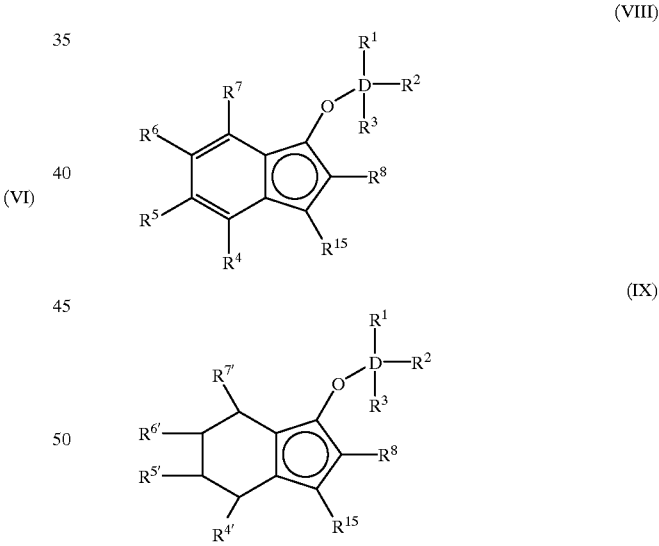

(VIII)

(IX)

Where D, R$^1$, R$^2$, R$^3$, R$^4$, R$^5$, R$^6$, R$^7$, R$^8$, R$^{4'}$, R$^{5'}$, R$^{6'}$ and R$^{7'}$ are the same as in formula V and R$^{15}$ is one of a hydrogen, a halogen, or a substituted or unsubstituted C$_1$–C$_{10}$ hydrocarbyl group. R$^6$ and R$^7$ may be cyclized in an aromatic or aliphatic 6-C ring. R$^5$ and R$^6$ may likewise by cyclized in an aromatic or aliphatic 6-C ring. R$^4$ and R$^5$ may likewise be cyclized in an aromatic or aliphatic 6-C ring. The same applies for pairs of R$^{4'}$–R$^{7'}$ (aromatic) or single groups of R$^{4'}$–R$^{7'}$ (aliphatic). R$^1$ and R$^2$ may also be cyclized in an aliphatic 5 ring or 6 ring.

Especially preferred for CpY$_q$ or Cp'Y'$_q$ of formula (VIII) and formula (IX) are 1-siloxyindenyl or 1-siloxy-4,5,6,7- tetrahydroindenyl ligands, where $R^4$, $R^5$, $R^6$, $R^7$, $R^8$ and $R^{15}$ are hydrogen, alkyl or aryl substituents. D is preferably silicon. $R^1$ and $R^3$ are preferably alkyl or aryl substituents and $R^2$ is preferably an alkyl substituent.

Particularly preferred unbridged 1-(siloxy)indenyl and 1-(siloxy)-4,5,6,7-tetrahydroindenyl ligands include as present 1-(tert-butyldimethylsiloxy)indenyl; 1-(thexyldimethylsiloxy)indenyl; 1-(tert-butyldimethylsiloxy)-4,5,6,7-tetrahydroindenyl; and 1-(thexyldimethylsiloxy)-4,5,6,7-tetrahydroindenyl ligands.

Preferred unbridged 1-(siloxy)indenyl and 1-(siloxy)-4,5,6,7-tetrahydroindenyl metallocenes according to the present invention include: rac- and meso-[bis(1-(tert-butyldimethylsiloxy)indenyl)]zirconium dichloride; rac- and meso-[bis(1-(thexyldimethylsiloxy)indenyl)]zirconium dichloride; rac- and meso-[bis(1-(tert-butyldimethylsiloxy)-4,5,6,7-tetrahydroindenyl)]zirconium dichloride; rac- and meso-[bis(1-(thexyldimethylsiloxy)-4,5,6,7-tetrahydroindenyl)]zirconium dichloride; and the same hafnium compounds such as: rac- and meso-[bis(1-(tert-butyldimethylsiloxy)indenyl)]hafnium dichloride; rac- and meso-[bis(1-(thexyldimethylsiloxy)indenyl)]hafnium dichloride; rac- and meso-[bis(1-(tert-butyldimethylsiloxy)-4,5,6,7-tetrahydroindenyl)]hafnium dichloride; rac- and meso-[bis(1-(thexyldimethylsiloxy)-4,5,6,7-tetrahydroindenyl)]hafnium dichloride; and the like.

The invention also relates to a 3-substituted indene compound, which has the general formula (X):

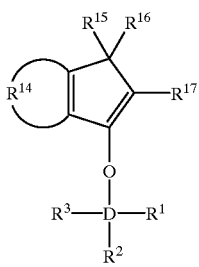

(X)

wherein: D is an element of Group 14 of the Periodic Table (IUPAC); $R^1$, $R^2$ and $R^3$ are the same or different and are each one of a hydrogen, a halogen, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; $R^{14}$ is a four atom chain forming an unsubstituted or substituted, further non-fused or further fused, homo(iso)cyclic or heterocyclic, unsaturated or saturated, aliphatic or aromatic six-membered ring; $R^{15}$ and $R^{16}$ are the same or different and are one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, one of $R^{15}$ and $R^{16}$ may be a bridge atom or group B to a cyclopentadienyl, indenyl, tetrahydroindenyl, fluorenyl or octahydrofluorenyl group, one of $R^{15}$ and $R^{16}$ may together with $R^{17}$ form a $C_5$–$C_8$ aliphatic ring, provided that one of $R^{15}$ and $R^{16}$ is hydrogen; and $R^{17}$ is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or a group as defined for said group —O—$DR^1R^2R^3$.

Preferably, the 3-substituted indene compound according to formula (X) has the formula (XI):

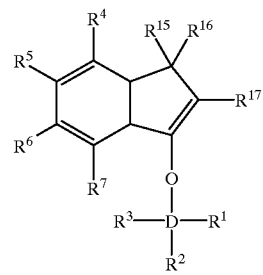

(XI)

wherein $R^1$, $R^2$, $R^3$, $R^{15}$, $R^{16}$ and $R^{17}$ are the same as above, $R^4$, $R^5$, $R^6$ and $R^7$ are the same or different and each is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ may form at least one aromatic $C_6$ ring, or at least two groups of $R^4$–$R^7$ may form at least one aliphatic $C_5$–$C_8$ ring.

According to one embodiment, the 1- or 3-substituted indene compound according to formulas (X) and (XI) has the general formula (XII):

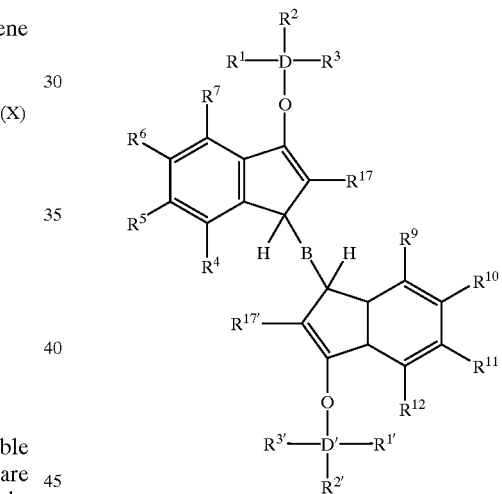

(XII)

wherein $R^1$, $R^2$, $R^3$, $R^{1'}$, $R^{2'}$ and $R^{3'}$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure or at least two of $R^{1'}$, $R^{2'}$ and $R^{3'}$ form together with D' a $C_4$–$C_{20}$ ring structure, D and D' are independently selected from Group 14 of the Periodic Table (IUPAC), $R^4$, $R^5$, $R^6$, $R^7$, $R^9$, $R^{10}$, $R^{11}$ and $R^{12}$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ or $R^9$–$R^{12}$ may form at least one aromatic $C_6$ ring, at least two groups of $R^4$–$R^7$ or $R^9$–$R^{12}$ may form at least one aliphatic $C_5$–$C_8$ ring, $R^{17}$ is the same as above (formula X) and $R^{17'}$ is as defined for $R^{17}$, and B is a $C_1$–$C_{10}$ alkylene, a $C_2$–$C_8$ silylene or a $C_1$–$C_{10}$ alkylene-$C_2$–$C_8$ silylene bridge.

In formula (XII) D and D' are preferably silicon. Independently, $R^4$, $R^5$, $R^6$, $R^7$, $R^9$, $R^{10}$, $R^{11}$, $R^{12}$, $R^8$ and $R^{13}$ in formula (XII) are preferably hydrogen. The bridge B is preferably ethylene or dimethyl silylene.

The present invention also relates to a process for the preparation of a 3-substituted indene compound. The process is substantially characterized in that a 3-indanone compound is reacted in a solvent with a base and a halogen compound $XDR^1R^2R^3$ to form a 3-$DR^1R^2R^3$-substituted indene according to the following reaction scheme (XIII):

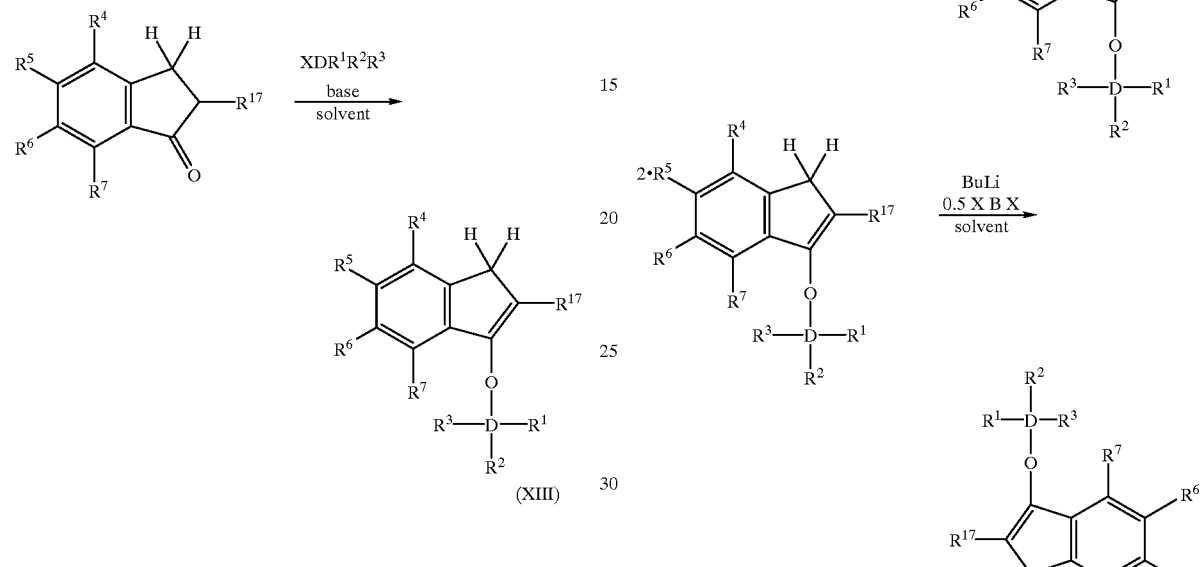

(XIII)

wherein $R^4$, $R^5$, $R^6$ and $R^7$ are the same or different and each is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ may form at least one aromatic $C_6$ zing, or at least two groups of $R^4$–$R^7$ may form at least one aliphatic $C_5$–$C_8$ ring, and $R^{17}$ is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or the same or different group —O—$DR^1R^2R^3$; D is an element of Group 14 of the Periodic Table (IUPAC); $R^1$, $R^2$ and $R^3$ are the same or different and are each one of a hydrogen, a halogen, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure, and X is a halogen.

In the method according to scheme (XIII) the base is preferably diazabicycloundecene (DBU) and the chlorosilane is independently and preferably tert-butyldimethylchlorosilane, thexyldimethylchlorosilane or cyclohexyldimethylchlorosilane. In scheme (XIII), $R^4$, $R^5$, $R^6$ $R^7$ and $R^{17}$ are preferably hydrogens.

The invention relates to the whole process of preparing bridged 1- or 3-(siloxy) indenyl metallocenes and 1- or 3-(siloxy)-4,5,6,7-tetrahydroindenyl metallocenes by using the following reaction scheme (XIV) (disclosed for indenyl metallocene, only):

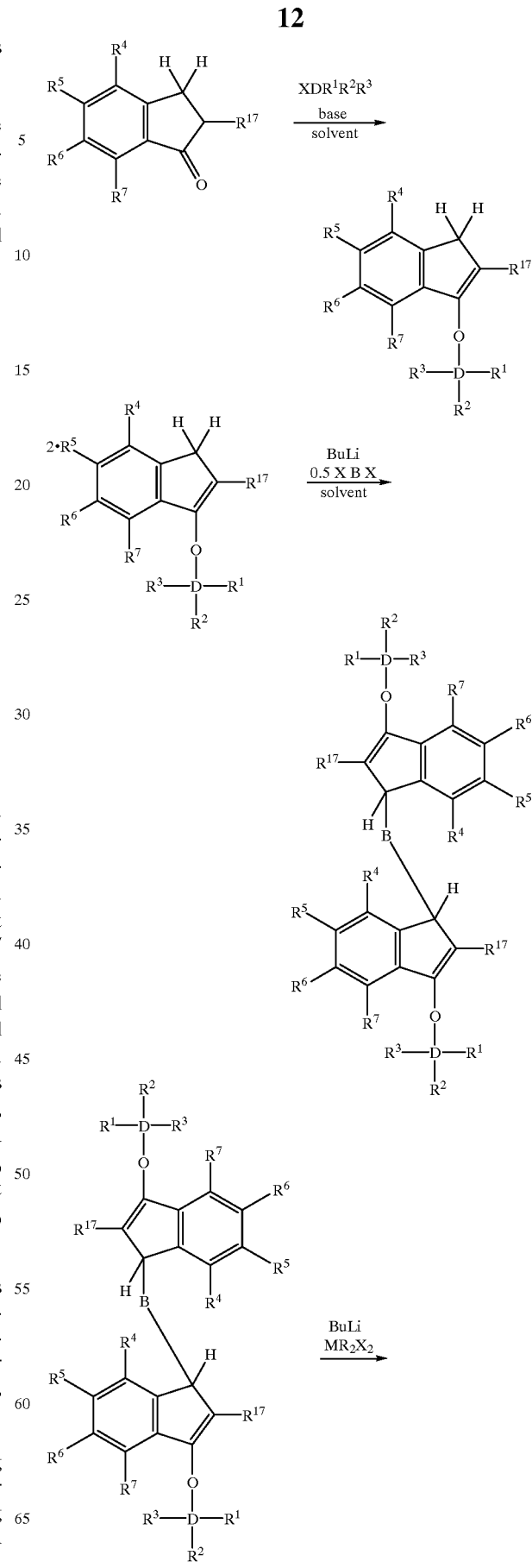

-continued

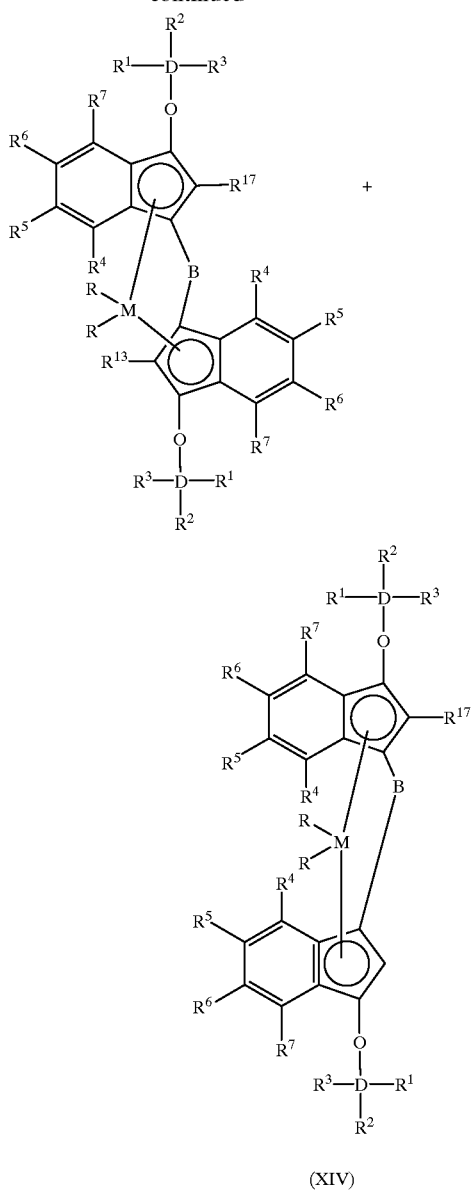

(XIV)

wherein: D is an element of Group 14 of the Periodic Table (IUPAC), $R^1$, $R^2$ and $R^3$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; B is a $C_1$–$C_{10}$ alkylene, a $C_2$–$C_8$ silylene or a $C_1$–$C_{10}$ alkylene-$C_2$–$C_8$ silylene; each X is independently a halogen; M is a transition metal of Group 4 of the Periodic Table (IUPAC); R or each same or different R is one of a hydrogen, a halogen, a substituted or unsubstituted $C_1$–$C_{10}$ hydrocarbyl group, a substituted or unsubstituted $C_1$–$C_{10}$ hydrocarbyloxy group a $C_1$–$C_{12}$ organosilicon group, or two R form together with M a $C_4$–$C_{20}$ metallocyclic ring structure; $R^4$, $R^5$, $R^6$ and $R^7$ are the same or different and are each one of a hydrogen, a halogen, a substituted or unsubstituted $C_1$–$C_{10}$ by drocarbyl group, a substituted or unsubstituted $C_1$–$C_{10}$ by drocarbylo, group, a $C_1$–$C_{12}$ organosilicon group, at least two adjacent groups of $R^4$–$R^7$ may form at least one aromatic $C_6$ ring or at least two groups of $R^4$–$R^7$ may form at least one aliphatic $C_5$–$C_8$ ring; and $R^{17}$ is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or the same or different group —O—$DR^1R^2R^3$.

In the process according to scheme (XIV), D is preferably silicon. $R^1$, $R^2$ and $R^3$ are preferably the same or different and are each an unsubstituted $C_1$–$C_{10}$ hydrocarbyl group, preferably wherein two of $R^1$, $R^2$ and $R^3$ are linear $C_1$–$C_4$ alkyl groups such as a methyl group and one of $R^1$, $R^2$ and $R^3$ is a branched $C_3$–$C_{10}$ alkyl group such as an isopropyl group, a tert-butyl group or a terthexyl group, a $C_5$–$C_8$ cycloalkyl group such as a cyclohexyl group, or a $C_6$ aryl group such as a phenyl group.

In scheme (XIV), B is preferably ethylene or dimethylsilylene and, independently, X is preferably chlorine or bromine. M is preferably zirconium.

Finally the invention relates to the use of the above described metallocene compounds for the polymerization (homo- and copolymerization) of ethylenically unsaturated monomers, preferably olefins such as ethylene, propylene and higher α-olefins. Monomers and comonomers with more than one double bond may also be used.

Appropriate cocatalysts in the polymerization include alkylaluminum compounds, alkyl aluminoxanes such as methylaluminoxane, modified methylaluminoxane or higher aluminoxanes such as tetraisobutyl aluminoxane, hexaisobutyl aluminoxane, etc. Other cocatalysts which may be used include Lewis or protic acids, such as $B(C_6F_5)_3$ or $[PhNMe_2H]^+B(C_6F_5)_4^-$, which generate cationic metallocenes with compatible non-coordinating anions in the presence or absence of alkylaluminum compounds.

EXPERIMENTAL

All operations were carried out in argon or nitrogen atmosphere using standard Schlenk, vacuum or glove box techniques. Solvents were dried and distilled under argon prior to use. The $^1H$ and $^{13}C$ NMR spectra were recorded in $CDCl_3$ or $CD_2Cl_2$ solution using JEOL JNM-LA400 or JEOL-A500 NMR spectrometer and referenced against tetramethylsilane or the residual protons of the deuterated solvents. Direct electron ionization mass spectra (EIMS) were obtained on a Varian VG-7070E or a Varian-8000 mass spectrometer.

EXAMPLE 1

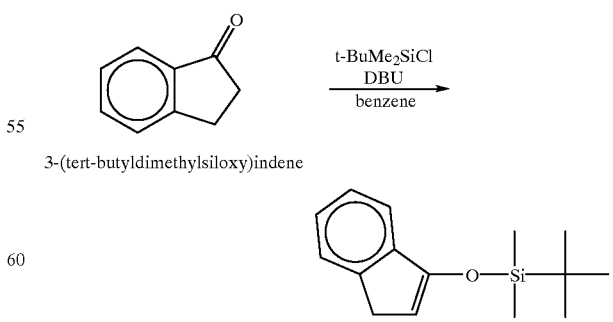

3-(tert-butyldimethylsiloxy)indene

To a solution of tert-butyldimethylchlorosilane (125.7 g, 834.0 mmol) and 1-indanone (100.2 g, 758.0 mmol) in benzene (400 ml) at room temperature was added dropwise DBU (150.0 g, 985.0 mmol). The reaction mixture was stirred overnight, diluted with Et$_2$O (200 ml), washed with water (2×200 ml) and dried over sodium sulfate. Evaporation of the solvents and distillation under reduced pressure gave 75.6 g (76.7%) of the title compound as a yellow oil (bp 82–84° C./0.1 mbar). $^1$H NMR (CDCl$_3$, δ): 7.39–7.35 (m, 2H); 7.30–7.26 (m, 1H); 7.21–7.17 (m, 1H); 5.39 (t, $^3$J=2.5 Hz, 1H); 3.24 (d, $^3$J=2.5 Hz, 2H); 1.02 (s, 9H); 0.24 (s, 6H). $^{13}$C NMR (CDCl$_3$, δ): 153.72; 142.67; 141.90; 125.97; 125.06; 123.71; 118.12; 105.77; 33.88; 25.72; 18.21; −4.72.

EXAMPLE 2

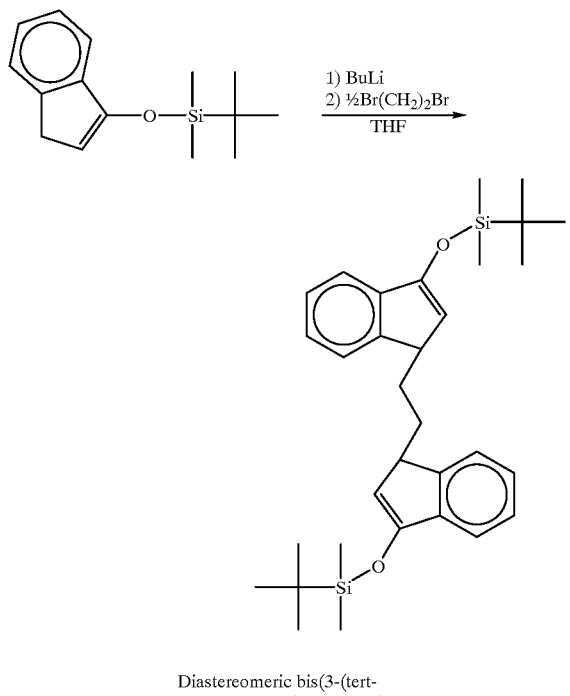

Diastereomeric bis(3-(tert-butyldimethylsiloxy)-1-indenyl)ethane

To an ice-cooled solution of 3-(tert-butyldimethylsiloxy) indene (24.6 g, 100.00 mmol) in THF (100 ml) was added dropwise n-BuLi (40.4 ml of a 2.5 M solution in hexane, 101.0 mmol), and the reaction mixture was stirred overnight at room temperature. The resulting solution was then cooled to −80° C. and treated dropwise with a solution of dibromoethane (9.39 g, 50.0 mmol) in THF (50 ml) at −80° C. The reaction mixture was gradually warmed to room temperature, stirred overnight and washed with saturated ammonium chloride solution (250 ml). The organic phase was dried over sodium sulfate. Solvents were evaporated and the remaining oil was dissolved in pentane (200 ml). Concentration and cooling to −15° C. gave 17.2 g (66.4%) of a mixture of the diastereomers A (major) and B (minor) of the title compound as an off-yellow powder. EIMS (calcd/found): m/e 518.3036/518.3044. $^1$H NMR (CDCl$_3$, δ): 7.34–7.17 (m, 8+8H, A/B); 5.38 (d, $^3$J=2.3 Hz, 2H, A); 5.37 (d, $^3$J=2.3 Hz, 2H, B); 3.40–3,35 (m, 2+2H, A/B); 2.07–1.98 (m, AA', 2H, A); 1.84–1.79 (m, AA', 2H, B); 1.65–1.59 (m, BB', 2H, B); 1.44–1.38 (m, BB', 2H, A); 1.02 (s, 18H, B); 1.01 (s, 18H, A); 0.25 (s, 6H, B); 0.23 (s, 6H, A); 0.23 (s, 6+6H, A/B). $^{13}$C NMR (CDCl$_3$, δ): 153.24 (A); 153.19 (B); 146.63 (B); 146.61 (A); 141.56 (B); 141.52 (A); 126.26 (A/B); 125.32 (A); 125.31 (B); 122.65 (B); 122.61 (A); 118.18 (A/B); 110.91 (B); 110.80 (A); 45.53 (A); 45.48 (B); 29.83 (A); 29.45 (B); 25.73 (A/B); 18.25 (A/B); −4.65 (B); −4.67 (A); −4.72 (B); −4.74 (A).

EXAMPLE 3

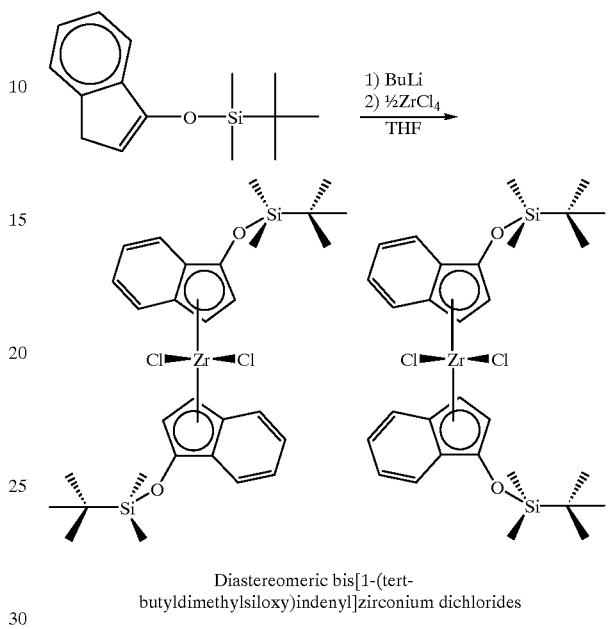

Diastereomeric bis[1-(tert-butyldimethylsiloxy)indenyl]zirconium dichlorides

To an ice-cooled solution of 3-(tert-butyldimethylsiloxy) indene (9.87 g, 40.0 mmol) in Et$_2$O (60 ml) was added dropwise n-BuLi (16.2 ml of a 2.5 M solution in hexane, 40.5 mmol), and the reaction mixture was stirred for two hours at room temperature. The solvents were removed in vacuo and the remaining off-yellow powder was mixed with ZrCl$_4$ (4.66 g, 20.0 mmol) followed by addition of toluene (80 ml). The deep red suspension was heated to 80° C. and stirred for one hour. The stirring was continued overnight at room temperature. The mixture was filtrated through Celite to remove lithium chloride and evaporated to dryness. The crude product was extracted with Et$_2$O and filtrated through Celite. Concentration and cooling to −30° C. gave 2.00 g (15.3%) of the diastereomers A of the title compound as a bright yellow powder. Concentration and cooling of the mother liquor to 0° C. gave 1.55 g (11.9%) of the diastereomer B of the title compound as a dark yellow powder, contaminated with traces of diastereomer A. (Total yield 27.2.%). In the EIMS mass spectra of both diastereomers parent ions of composition C$_{30}$H$_{42}$Si$_2$O$_2$ZrCl$_2$$^+$ were observed at m/e=650–658 in the appropriate isotope ratios. A: $^1$H NMR (CD$_2$Cl$_2$, δ): 7.27–7.24 (m, 2H); 7.55–7.53 (m, 2H); 7.17–7.10 (m, 4H); 5.84 (dd, $^3$J=3.3 Hz, $^4$J=0.9 Hz, 2H); (5.55 (d, $^3$J=3.3 Hz, 2H); 1.07 (s, 18H); 0.29 (s, 6H). $^{13}$C NMR (CD$_2$Cl$_2$, δ): 144.20; 126.55; 125.61; 125.34; 125.25; 121.83; 117.82; 104.87; 93.45; 25.84; 18.62; −3.81; −4.53 B: $^1$H NMR (CD$_2$Cl$_2$, δ): 7.55–7.52 (m, 2H); 7.36–7.32 (m, 2H); 7.23–7.15 (m, 4H); 5.64 (dd, $^3$J=3.3 Hz, $^4$J=0.9 Hz, 2H); 5.44 (d, $^3$J=3.3 Hz, 2H); 1.05 (s, 18H); 0,27 (s, 6H); 0.18 (s, 6H). $^{13}$C NMR (CD$_2$Cl$_2$, δ): 143.87; 126.67: 125.76; 125.42: 124.60; 121.83; 118.29; 105.39; 92.12; 25.80: 18.55; −3.79; −4.63.

EXAMPLE 4

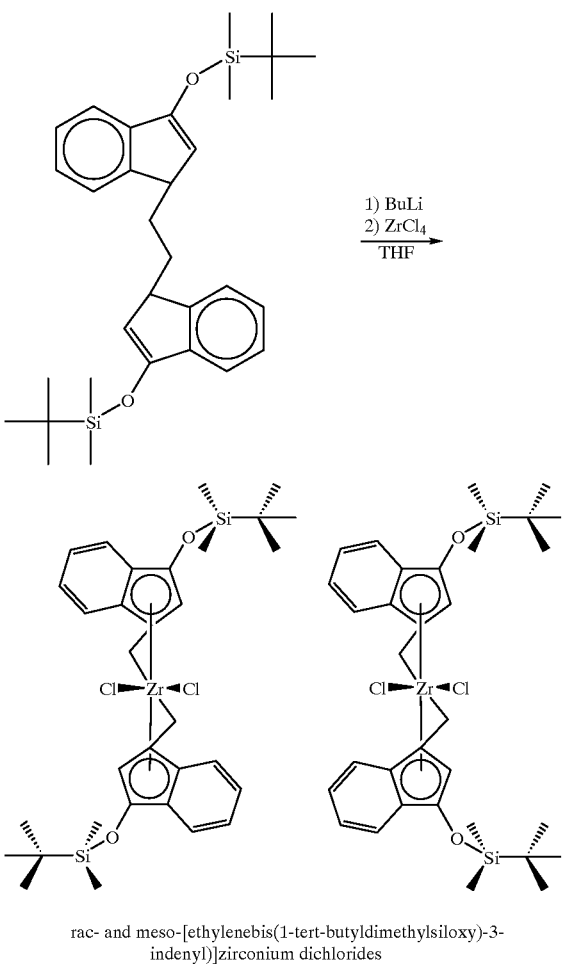

rac- and meso-[ethylenebis(1-tert-butyldimethylsiloxy)-3-indenyl)]zirconium dichlorides To a solution of bis(3-(tert-butyldimethylsiloxy)-1-indenyl)ethane (12.8 g, 24.7 mmol) in THF (70 ml) at −40° C. was added dropwise n-BuLi (19.9 ml of a 2.5 M solution in hexane, 49.7 mmol), and the reaction mixture was stirred for four hours at room temperature. The resulting dark red solution was added dropwise to a suspension of $ZrCl_4$ (5.76 g, 24.7 mmol) in THF (80 ml) at −60° C. The reaction mixture was gradually warmed to room temperature and stirred overnight. Evaporation of the solvents left a bright orange solid that was extracted with $CH_2Cl_2$ (150 ml) and filtrated through Celite to remove lithium chloride. The solvent was evaporated and the crude product was extracted with $Et_2O$ (250 ml) and filtrated through Celite. Pure racemic diastercomer can also be obtained by recrystallization from toluene. Concentration and cooling to −30° C. gave 4.09 g (20.1%) of a 5:1 mixture of the rac and meso diastereomers of the title compound. 2THF as a bright orange powder. Further concentration and cooling gave the second crop 0.56 g (1.7%) consisting of the pure rac diastereomer•2THF. The remaining crude product from the $Et_2O$ extraction was extracted with $CH_2Cl_2$ (150 ml) and filtrated through Celite. Pure racemic diastereomer can also be obtained by recrystallization from toluene. Concentration and cooling to −30° C. gave 0.70 g (3.70%) of the pure meso diastereomer•$CH_2Cl_2$ as a dark orange powder. (Total yield 25.5%). In the EIMS mass spectrum of the rac diastereomer parent ions of composition $C_{32}H_{44}Si_2O_2ZrCl_2^+$ were observed at m/e=676–684 in the appropriate isotope ratios.

rac-diastereomer. $^1H$ NMR ($CD_2Cl_2$, δ): 7.39–7.34 (m, 4H); 7.14–7.10 (m, 2H): 7.04–7.00 (m, 2H): 5.60 (s, 2H); 3.77–3.67 (m, AA', 2H); 3.49–3.39 (m, BB', 2H); 0.97 (s, 18H); 0.21 (s, 6H); 0,19 (s, 6H). $^{13}C$ NMR ($CD_2Cl_2$, δ): 145.88; 126.55; 124.88; 122.48; 122.02; 121.38; 117.48; 111.09; 99.50; 28.69; 25.79; 18.65; −3.51; −4.32.

meso-diastereomer. $^1H$ NMR ($CD_2Cl_2$, δ): 7.45–7.43 (m, 2H); 7.36–7.34 (m, 2H); 7.04–7.01 (m, 2H); 6.98–6.94 (m, 2H); 5.72 (s, 2H); 4.01–3.93 (m, AA', 2H); 3.51–3,43 (m, BB', 2H); 1,02 (s, 18H); 0.32 (s, 6H); 0,23 (s, 6H). $^{13}C$ NMR ($CD_2Cl_2$, δ): 144.36; 126.71; 124.72; 122.59; 122.31; 121.84; 118.65; 110.84; 102.47; 30.10; 25.83; 18.71; −3.56; −4.31.

EXAMPLE 5

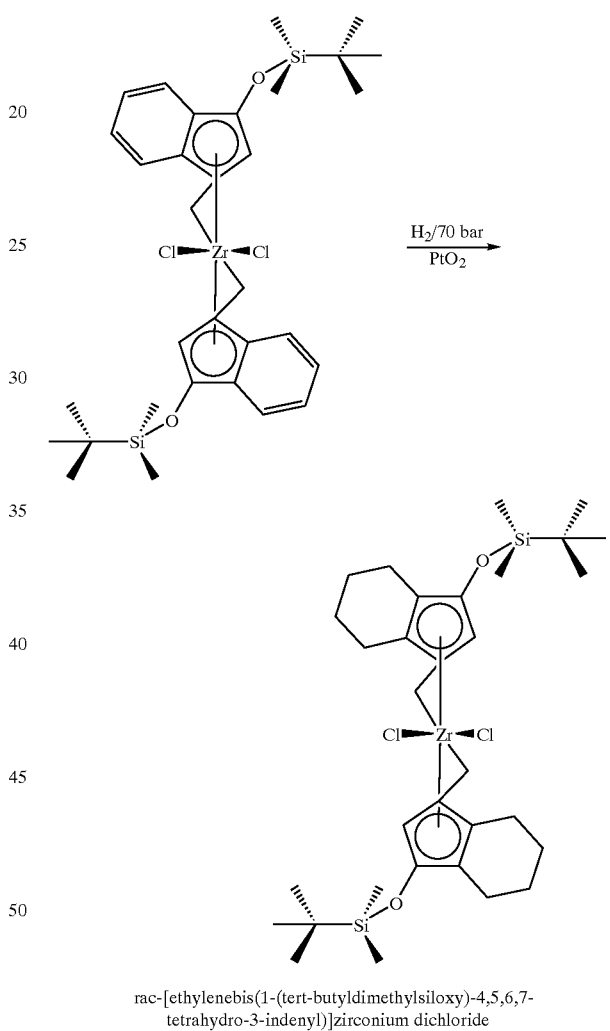

rac-[ethylenebis(1-(tert-butyldimethylsiloxy)-4,5,6,7-tetrahydro-3-indenyl)]zirconium dichloride A 5:1 mixture of rac- and meso-[ethylenebis(1-(tert-butyldimethylsiloxy)-3-indenyl)]zirconium dichloride 2 THF (2.13 g, 2.59 mmol) and $PtO_2$ (20 mg) in $CH_2Cl_2$ (150 ml) was hydrogenated at 70 bar in a stirred reactor for 16 h. The light green suspension was filtered through Celite and the solvent evaporated. The residue was dissolved in pentane (100 ml) and cooled to −15° C. to provide the title compound as a light green microcrystalline solid. In the EIMS mass spectrum of the title compound parent ions of composition $C_{32}H_{52}Si_2O_2ZrCl_2^+$ were observed at m/e=684–692 in the appropriate isotope ratios. The stereochemistry was confirmed by X-ray analysis. $^1$H NMR (CDCl$_3$, δ): 4.96 (s, 2H); 3.09–2.99 (m, AA', 2H); 2.89–2.79 (m, BB', 2H); 2.71–2.64 (m, 2H); 2.47–2.29 (m, 6H); 1.99–1.84 (m, 4H); 1.56–1.35 (m, 4H); 0.94 (s, 18H); 0.22 (s, 6H); 0.15 (s, 6H). $^{13}$C NMR (CDCl$_3$, δ): 151.00; 121.61; 121.18; 116.04; 94.68; 27.66; 25.74; 23.47; 22.05; 21.89; 20.52; 18.33; −3.33; −4.20. A figure representing the space structure of the hydrogenated product is enclosed in the figure.

What is claimed is:

1. A metallocene compound, characterized in that it has the formula (I):

wherein: Cp or each same of different Cp is a non-substituted or substituted, fused or non-fussed, homo(iso) cyclic or heterocyclic cyclopentadienyl ligand, indenyl ligand, tetrahydroindenyl ligand, fluorenyl ligand or octahydrofluorenyl ligand, Y or each same or different Y is a substituent at the cyclopentadienyl ring of said ligand Cp having the following structure (II):

wherein: D is silicon or germanium, $R^1$, $R^2$ and $R^3$ are the same or different and are each one of a hydrogen a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; M is a transition metal of Group 4 of the Periodic Table (IUPAC), an d is bound to the ligand Cp or ligands Cp in η$^5$ bonding mode; R or each same or different R is bound to M and is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or two R form together with M a $C_4$–$C_{20}$ metallocyclic ring structure; B is a bridge atom or group between two Cp ligands or between one Cp ligand and M; q is, when Cp is non-bridged , 0–5 for the cyclopentadienyl ligand, 0–3 for the indenyl or tetrahydroindenyl ligand and 0–1 for the fluorenyl or octahydroffuorenyl ligand, each q is, when Cp is bridged, 0–4 for the cyclopentadienyl ligand, 0–2 for the indenyl or tetrahydroindenyl ligand and 0 for the fluorenyl or octahydrofluorenyl ligand; m is 1 or 2; m·q$_{average}$≧1; o is 0 or 1; and n is 4−m−o, except when there is one bridge B between two Cp ligands, in which case n is 4-m, with the exception of metallocenes having a bridged indenyl ligand substituted by Y in the 2-position.

2. A metallocene compound according to claim 1, characterized in that the ligand Cp or each of the ligands Cp is a mono- or polysubstituted, non-fused, homocyclic indenyl or tetrahydroindenyl ligand.

3. A metallocene compound according to claim 1 or 2, characterized in that the substituent Y or each of the substituents Y has the above structure (II), wherein D is silicon.

4. A metallocene compound according to claim 1, characterized in that the substituent Y or each of the substituents Y has the above structure (II), wherein $R^1$, $R^2$ and $R^3$ are the same or different and are each an unsubstituted $C_1$–$C_{10}$ hydrocarbyl group.

5. A metallocene according to claim 1, characterized in that M is zirconium.

6. A metallocene compound according to claim 1, characterized in that R, or each B independently is one of an unsubstituted $C_1$–$C_4$ alkyl group or a halogen.

7. A metallocene compound according claim 1 characterized in that B is a bridge atom or group between two Cp ligands.

8. A metallocene according to claim 1, characterized in that B is a bridge atom or group between one Cp ligand and M.

9. A metallocene compound according to claim 1, characterized in that it does not have a group CpY$_q$ wherein Cp is an indenyl or tetrahydroindenyl ligand monosubstituted (q=1) by Y at its 2-position, the D of Y being silicon or germanium; except when it has a second group CpY$_q$, wherein Cp is an unsubstituted ligand (q=0) bridged by B to said first group CpY$_q$.

10. A metallocene compound according to claim 1, characterized in that Cp is an indenyl or tetrahydroindenyl ligand substituted by Y at least at its 1- or 3-position.

11. A metallocene compound according to claim 1, characterized in that it has the formula (IIIa) or (IIIb):

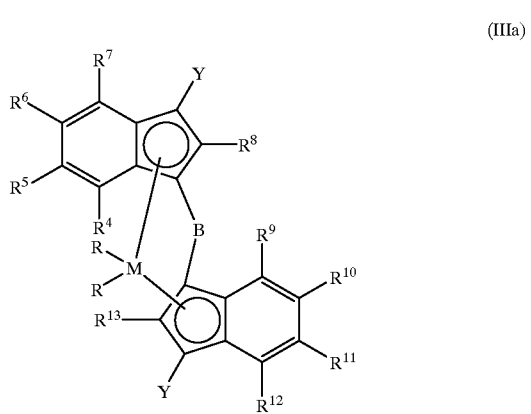

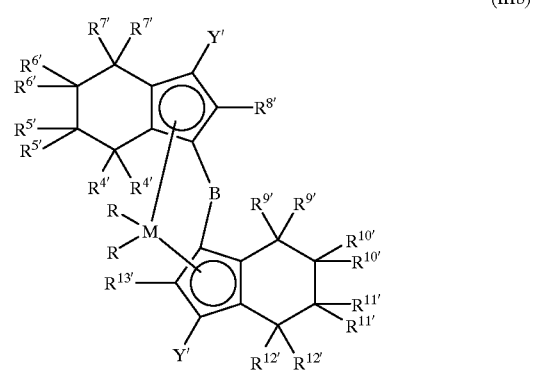

wherein: each Y is the same as above, each Y' is as defined for Y; $R^4$, $R^5$, $R^6$, $R^7$, $R^9$, $R^{10}$, $R^{11}$, $R^{12}$, $R^{4'}$, $R^{5'}$, $R^{6'}$, $R^{7'}$, $R^{9'}$, $R^{10'}$, $R^{11'}$, $R^{12'}$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ or $R^9$–$R^{12}$ in formula (IIIa) may form at least one aromatic $C_6$ ring, at least two groups of $R^4$–$R^7$ or $R^9$–$R^{12}$ in formula (IIIa) may form at least one aliphatic $C_5$–$C_3$ ring, one pair of equally numbered groups and another adjacent pair of equally numbered groups of $R^{4'}$–$R^{7'}$ or $R_{9'}$–$R^{12'}$ in formula (IIIb) may form an aromatic $C_6$ ring, or at least two groups of $R^{4'}$–$R^{7'}$ or $R^{9'}$–$R^{12'}$ in formula (IIIb) may form at least one aliphatic $C_5$–$C_8$ ring, $R^8$, $R^{13}$, $R^{8'}$ and $R^{13'}$ are the same or different and are each one of a hydrogen atom, a halogen atom, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or the group Y; M is the same as above, M' is as defined for M; B is a bridge between two Cp ligands as defined above, B' is as defined for B; each R is the same as above and each R' is as defined for R.

12. A metallocene compound, characterized in that it has the formula (I):

(I)

wherein: Cp or each same of different Cp is a non-substituted or substituted, fused or non-fused, homo(iso)cyclic or heterocyclic cyclopentadienyl ligand, indenyl ligand, tetrahydroindenyl ligand, fluorenyl ligand or octahydrofluorenyl ligand, Y or each same or different Y is a substituent at the cyclopentadienyl ring of said ligand Cp having the following structure (II):

(II)

wherein: D is an element of Group 14 of the Periodic table (IUPAC), $R^1$, $R^2$ and $R^3$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; M is a transition metal of Group 4 of the Periodic Table (IUPAC), and is bound to the ligand Cp or ligands Cp in an $\eta^5$ bonding mode; R or each same or different R is bound to M and is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or two R form together with M a $C_4$–$C_{20}$ metallocyclic ring structure; B is a bridge atom or group between two Cp ligands or between one Cp ligand and M; q is, when Cp is non-bridged, 0–5 for the cyclopentadienyl ligand, 0–3 for the indenyl or tetrahydroindenyl ligand and 0–1 for the fluorenyl or octahydrofluorenyl ligand, each q is, when Cp is bridged, 0–4 for the cyclopentadienyl ligand, 0–2 for the indenyl or tetrahydroindenyl ligand and 0 for the fluorenyl or octahydrofluorenyl ligand; m is 1 or 2; m·$q_{average}$ ≦ 1; o is 0 or 1; and n is 4–m–o, except when there is one bridge B between two Cp ligands, in which case n is 4-m, with the exception of metallocenes having a bridged indenyl ligand substituted by Y in the 2-position further comprising an [ethylenebis(1-(tert-butylmethylsiloxy)indenyl)]zirconium dichloride which has the formula (IVa), the formula (IVb), or is a mixture of a compound having the formula (IVa) and a compound having the formula (IVb):

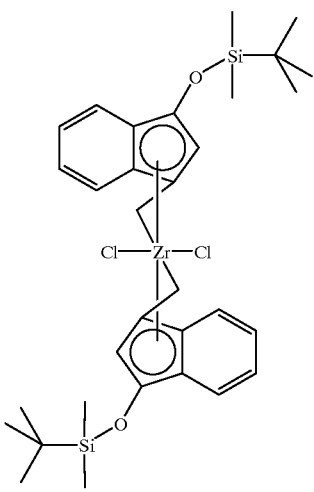

(IVa)

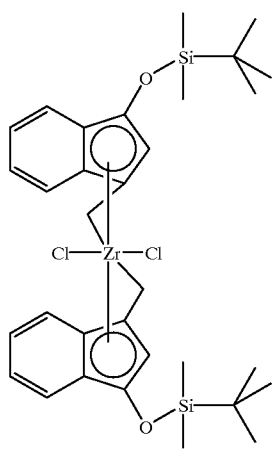

(IVb)

13. A, 3-substituted indene compound characterized in that it has the general formula (X):

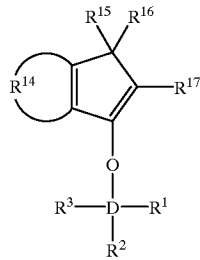

(X)

wherein: D is silicon or germanium; $R^1$, $R^2$ and $R^3$ are the same or different and are each one of a hydrogen, a halogen, a substituted or unsubstituted $C_1$–$C_{10}$ hydrocarbyl group, a $C_1$–$C_{12}$ organosilicon group, or at least two of $R^1$, $R^2$ and $R^3$ form together with D a $C_4$–$C_{20}$ ring structure; $R^{14}$ is a four atom chain forming an unsubstituted or substituted, further non-fused or further fused, homo(iso)cyclic or heterocyclic, unsaturated or saturated, aliphatic or aromatic six-membered ring; $R^{15}$ and $R^{16}$ are the same or different and are one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, one of $R^{15}$ and $R^{16}$ may be a bridge atom or group B to a cyclopentadienyl, indenyl, tetrahydroindenyl, fluorenyl or octahydrofluoroenyl group, one of $R^{15}$ and $R^{16}$ may together with $R^{17}$ form an a $C_5$–$C_8$ aliphatic ring, provided that one of $R^{15}$ and $R^{16}$ is hydrogen; and $R^{17}$ is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or a group as defined for said group —O—$DR^1R^2R^3$.

14. A 3-substituted indene compound according to claim 13, characterized in that it has the formula (XI):

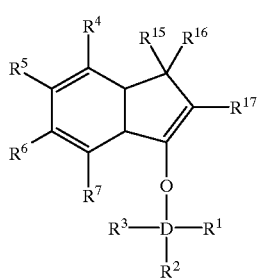

(XI)

wherein $R^1$, $R^2$, $R^3$, $R^{15}$, $R^{16}$ and $R^{17}$ are the same as above, $R^4$, $R^5$, $R^6$ and $R^7$ are the same or different and each is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ may form at least one aromatic $C_6$ ring, or at least two groups of $R^4$–$R^7$ may form at least one aliphatic $C_5$–$C_8$ ring.

15. A 1- or 3-substituted indene compound according to claim 13 or 14, characterized in that it has the general formula (XII):

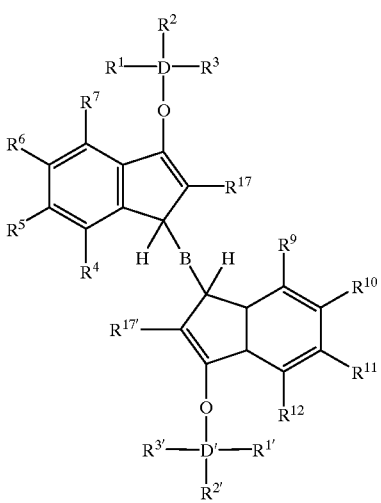

(XII)

wherein $R^1$, $R^2$, $R^3$, $R^{1'}$, $R^{2'}$ and $R^{3'}$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D' a $C_4$–$C_{20}$ ring structure or at least two of $R^{1'}$, $R^{2'}$ and $R^{3'}$ form together with D' a $C_4$–$C_{20}$ ring structure, D and D' are independently selected from silicon or germanium, $R^4$, $R^5$, $R^6$, $R^7$, $R^9$, $R^{10}$, $R^{11}$ and $R^{12}$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ or $R^9$–$R^{12}$ may form at least one aromatic $C_6$ ring, at least two soups of $R^4$–$R^7$ or $R^9$–$R^{12}$ may form at least one aliphatic $C_5$–$C_8$ ring, $R^{17}$ is the same as above and $R^{17'}$ is as defined for $R^{17}$, and B is a $C_1$–$C_{10}$ alkylene, a $C_2$–$C_8$ silylene or a $C_1$–$C_{10}$ alkylene-$C_2$–$C_8$ silylene bridge.

16. A 1- or 3-substituted indene compound having the general formula (XII):

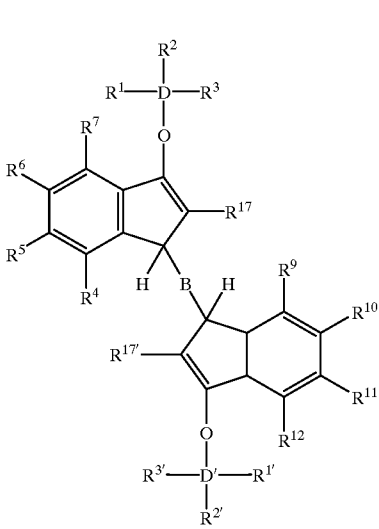

(XII)

wherein $R^1$, $R^2$, $R^3$, $R^{1'}$, $R^{2'}$ and $R^{3'}$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure or at least two of $R^{1'}$, $R^{2'}$ and $R^{3'}$ form together with D' a $C_4$–$C_{20}$ ring structure, D and D' are independently selected from Group 14 of the Periodic Table (IUPAC), $R^4$, $R^5$, $R^6$, $R^7$, $R^9$, $R^{10}$, $R^{11}$ and $R^{12}$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group at least two adjacent groups of $R^4$–$R^7$ or $R^9$–$R^{12}$ may form at least one aromatic $C_6$ ring, at least two soups of $R^4$–$R^7$ or $R^9$–$R^{12}$ may form at least one aliphatic $C_5$–$C_8$ ring, $R^{17}$ is the same as above and $R^{17'}$ is as $R^{17}$, and B is a $C_1$–$C_{10}$ alkylene, a $C_2$–$C_8$ silylene or a $C_1$–$C_{10}$ alkylene-$C_2$–$C_8$ silylene bridge wherein D and D' are silicon.

17. A 1- or 3-substituted indene compound according to claim 15, characterized in that $R^4$, $R^5$, $R^6$, $R^7$, $R^9$, $R^{10}$, $R^{11}$, $R^{12}$, $R^8$ and $R^{13}$ are hydrogen.

18. A 1- or 3-substituted indene compound according to claim 15, characterized in that the bridge B is ethylene or dimethyl silylene.

19. A catalyst system comprising or produced by the reaction of a metallocene catalyst precursor as claimed in claim 1 and an alkyl aluminoxane comprising alkyl groups containing one carbon atom, or optionally at least two carbon atoms.

20. A method for the preparation of a heterogeneous catalyst system, said method comprising contacting a porous solid support with (i) a $C_2$–$C_{20}$ alkyl alumoxane and a metallocene which has the formula (I):

$$(C_PYq)_mMR_nB_o \qquad (I)$$

wherein: Cp or each same of different Cp is a non-substituted or substituted, fused or non-fused, homo(iso)cyclic or heterocyclic cyclopentadienyl ligand, indenyl ligand, tetrahydroindenyl ligand, fluorenyl ligand or octahydrofluorenyl ligand, Y or each same or different Y is a substituent at the cyclopentadienyl ring of said ligand Cp having the following structure (II):

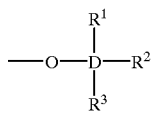

(II)

wherein: D is silicon or germanium, $R^1$, $R^2$ and $R^3$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; M is a transition metal of Group 4 of the Periodic Table (IUPAC) and is bound to the legend Cp or ligands Cp in an $\eta^5$ bonding mode; R or each same or different R is bound to M and is one of a hydrogen, a halogen, a substituted or unsubstituted $C_1$–$C_{10}$ hydrocarbyl group, a substituted, or unsubstituted $C_1$–$C_{10}$ hydrocarbyloxy group, a $C_1$–$C_{12}$ organosilicon group, or two R form together with M a $C_4$–$C_{20}$ metallocyclic ring structure; B is a bridge atom or group between two Cp ligands or between one Cp ligand and M; q is, when Cp is non-bridged, 0–5 for the cyclopentadienyl ligand, 0–3 for the indenyl or tetrahydroindenyl ligand and 0–1 for the fluorenyl or octahydrofluorenyl ligand, each q is, when Cp is bridged, 0–4 for the, cyclopentadienyl ligand, 0–2 for the indenyl or tetrahydroindenyl ligand and 0 for the fluorenyl or octahydrofluorenyl ligand; m is 1 or 2; $m \cdot q_{\cdot average} \leq 1$; o is 0 or 1; and n is 4–m–o, except when there is one bridge B between two Cp ligands, in which case n is 4–m, or with the reaction product of a $C_2$–$C_{20}$ alkyl alumoxane and said metallocene and optionally (ii) an organometallic metallocene activator.

21. A method according to claim 20, characterized in that the metallocene has any of the technical features disclosed in claims 2 to 12.

22. A process for the catalysed polymerization of an olefin, wherein as catalyst is used a metallocene and a cocatalyst, or the reaction product of a metallocene and an alumoxane, the improvement comprising using as said catalyst a metallocene as claimed or described in claim 1 or a reaction product thereof.

23. Process for the preparation of a 3-substituted indent compound, characterized in that a 1-indanone compound is reacted in a solvent with a base and a halogen compound $XDR^1R^2R^3$ to form a 1-siloxy- or 1-germyloxyindene according to the following reaction scheme (XIII):

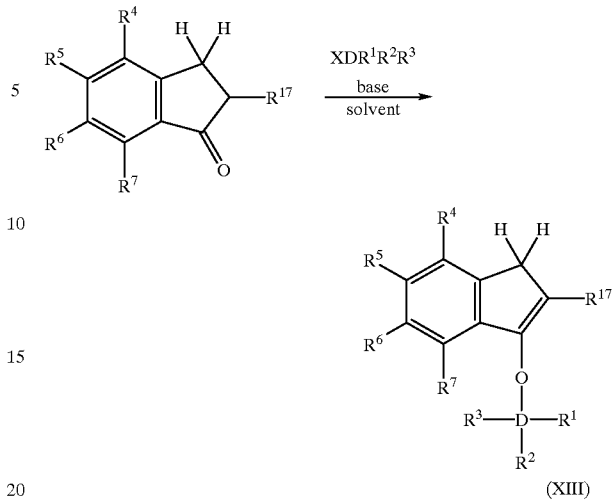

(XIII)

wherein $R^4$, $R^5$, $R^6$ and $R^7$ are the same or different and each is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ may form at least one aromatic $C_6$ ring, or at least two groups of $R^4$–$R^7$ may form at least one aliphatic $C_5$–$C_8$ ring, and $R^{17}$ is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or the same or different group —O—$DR^1R^2R^3$; D is silicon or germanium $R^1$, $R^2$ and $R^3$ are the same or different and are each one of a hydrogen, a halogen, a substituted or unsubstituted $C_1$–$C_{10}$ by hydrocarbyloxy group; a $C_1$–$C_{12}$ organosilicon group, or at least two of $R^1$, $R^2$ and $R^3$ form together with D a $C_4$–$C_{20}$ ring structure, and X is a halogen.

24. A process for the preparation of a 3-substituted indene compound wherein a 1-indanone compound is reacted in a solvent with a base and a halogen compound $XDR^1R^2R^3$ to form a 1-siloxyindene according to the following reaction scheme (XIII):

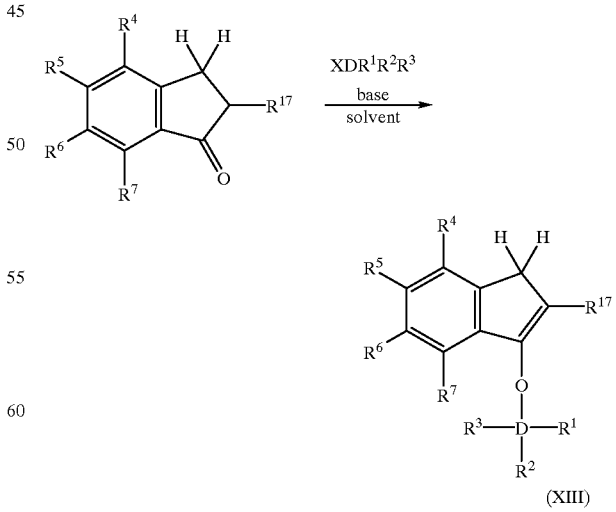

(XIII)

wherein $R^4$, $R^5$, $R^6$ and $R^7$ are the same or different and each is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R^4$–$R^7$ may form at least one aromatic $C_6$ ring, or at least two groups of $R^4$–$R^7$ may form at least one aliphatic $C_5$–$C_8$ ring, and $R^{17}$ is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or the same or different group —O—$DR^1R^2R^3$; D is an element of Group 14 of the Periodic Table (IUPAC); $R^1$, $R^2$ and $R^3$ are the same or different and are each one of a hydrogen, a halogen, a substituted or unsubstituted $C_1$–$C_{10}$ by hydrocarbyloxy group; a $C_1$–$C_{12}$ organosilicon group, or at least two of $R^1$, $R^2$ and $R^3$ form together with D a $C_4$–$C_{20}$ ring structure, and X is a halogen and wherein the base is diazabi-undecene (DBU) and the chlorosilane is tert-butyldimethylchlorosilane, terthexyldimethylchlorosilane or cyclohexyldimethylchlorosilane.

25. A method according to claim 24, characterized in that $R^4$, $R^5$, $R^6$, $R^7$ and $R^{17}$ are hydrogens.

26. Process for the preparation of bridged 1-(siloxy) or germyloxy indenyl metallocenes and 1 (siloxy) or germyloxy-4,5,6,7-tetrahydroindenyl metallocenes characterized by the following reaction scheme XIV):

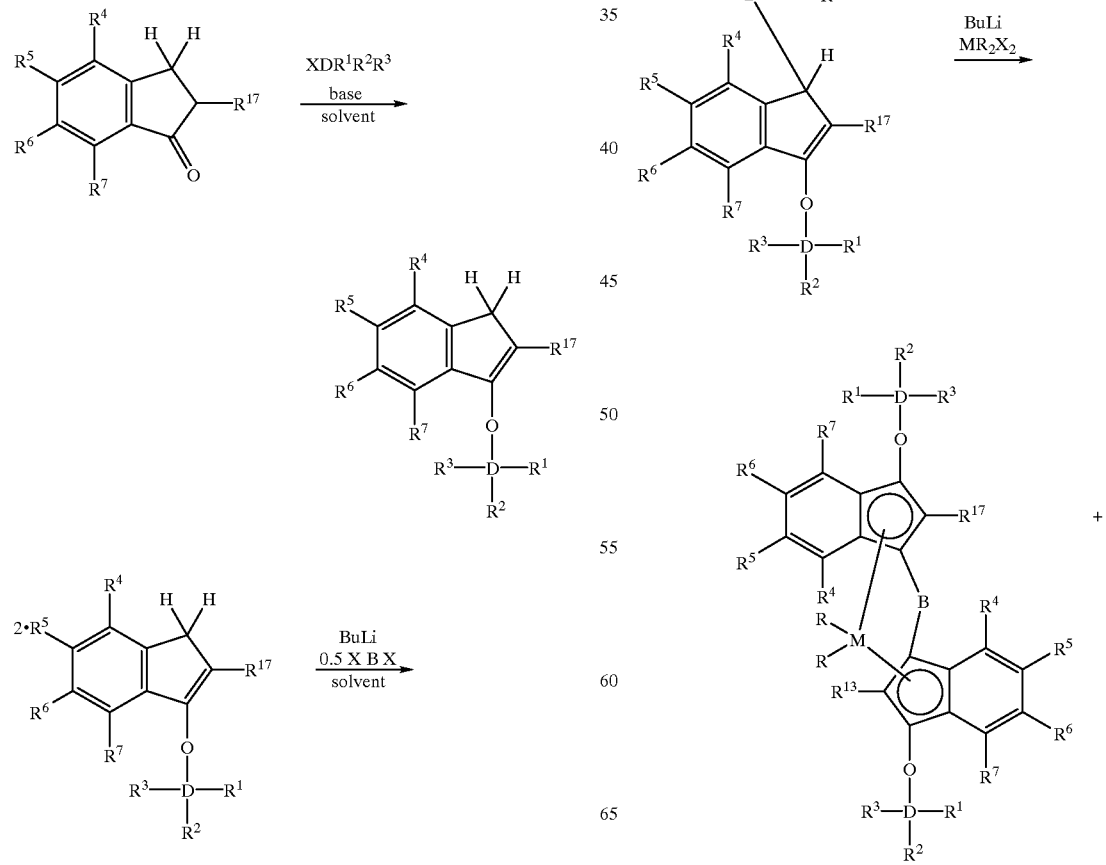

-continued

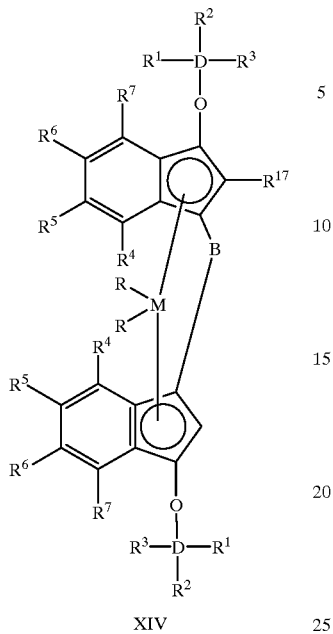

XIV wherein: D is silicon or germanium, $R^1$, $R^2$ and $R^3$ are, the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; B is a $C_1$–$C_{10}$ alkylene, a $C_2$–$C_8$ silylene or a $C_1$–$C_{10}$ alkylene-$C_2$–$C_8$ silylene; each X is independently a halogen; M is a transition metal of Group 4 of the Periodic Table (IUPAC); R or each same or different R is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or two R form together with M a $C_4$–$C_{20}$ metallocyclic ring structure; $R^4$, $R^5$, $R^6$ and $R^7$ are the same or different an each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjucent groups of $R^4$–$R_7$ may form at least one aromatic $C_6$ ring or at least two groups of $R^4$–$R^7$ may form at least one aliphatic $C_5$–$C_8$ ring; and $R^{17}$ is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or the same or different group —O—$DR^1R^2R^3$.

27. Process for the preparation of bridged 1-(siloxy) indenyl metallocenes and 1 (siloxy)-4,5,6,7-tetrahydroindenyl metallocenes characterized by the following reaction scheme (IV):

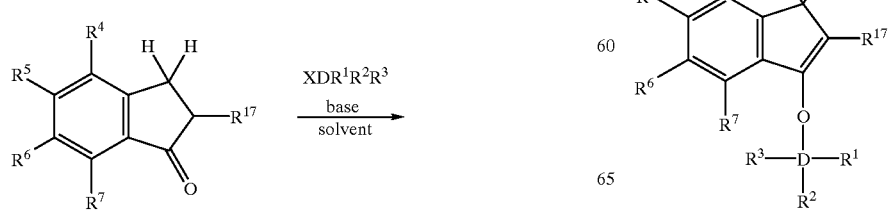

-continued

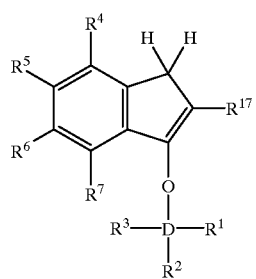

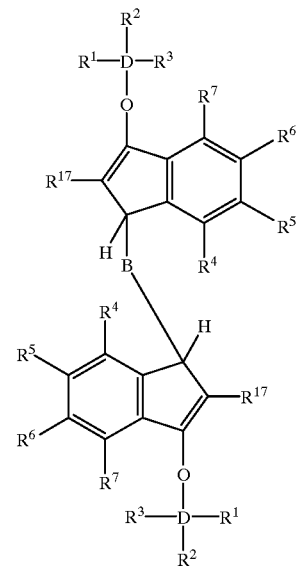

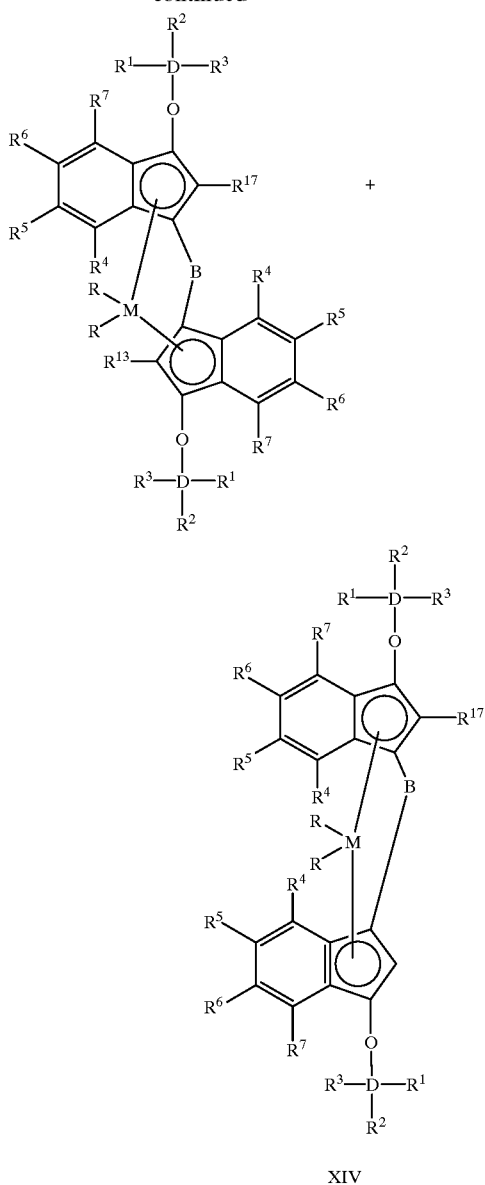

XIV wherein: D is an element of Group 14 of the Periodic Table (IUPAC), $R^1$, $R^2$ and $R^3$ are, the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or at least two of $R^1$, $R^2$ and $R^3$ form together with D a $C_4$–$C_{20}$ ring structure; B is a $C_1$–$C_{10}$ alkylene, a $C_2$–$C_8$ silylene or a $C_1$–$C_{10}$ alkylene-$C_2$–$C_8$ silylene; each X is independently a halogen; M is a transition metal of Group 4 of the Periodic Table (IUPAC); R or each same or different R is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, or two R form together with M a $C_4$–$C_{20}$ metallocyclic ring structure; $R^4$, $R^5$, $R^6$ and $R^7$ are the same or different and are each one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group, at least two adjacent groups of $R_4$–$R_7$ may form at least one aromatic $C_6$ ring or at least two groups of $R^4$–$R^7$ may form at least one aliphatic $C_5$–$C_8$ ring; and $R^{17}$ is one of a hydrogen, a halogen, a substituted or unsubstituted $C_1$–$C_{10}$ hydrocarbyl group, a substituted or unsubstituted $C_1$–$C_{10}$ hydrocarbyloxy group, a $C_1$–$C_{12}$ organosilicon group or the same or different group —O—$DR^1R^2R^3$ and wherein D is silicon.

28. A process according to claim 26 or 27, characterized in that $R^1$, $R^2$ and $R^3$ are the same or different and are each an unsubstituted $C_1$–$C_{10}$ hydrocarbyl group.

29. A process according to claim 26, characterized in that B is ethylene or dimethylsilylene.

30. A process according to claim 26, characterized in that X is chlorine or bromine.

31. A process according to claim 26, characterized in that M is zirconium.

32. A method for the polymerization of ethylenically unsaturated monomers comprising contacting the monomer with the metallocene compound according to claim 1.

33. A method for the polymerization of ethylenically unsaturated monomers according to claim 32 comprising the additional step of contacting the monomer and the metallocene compound with an aluminum compound.

34. The metallocene compound according to claim 4, wherein two of $R^1$, $R^2$ and $R^3$ are linear $C_1$–$C_4$ alkyl groups and one of $R^1$, $R^2$ and $R^3$ is a branched $C_3$–$C_4$ alkyl group.

35. The metallocene compound according to claim 4, wherein two of $R^1$, $R^2$ and $R^3$ are methyl groups.

36. The metallocene compound according to claim 4, wherein one of $R^1$, $R^2$ and $R^3$ is an isopropyl group, a tert-butyl group, a thexyl group, a $C_5$–$C_8$ cycloalykl group or a $C_6$ aryl group.

37. The metallocene compound according to claim 4, wherein said $C_5$–$C_8$ cycloalkyl group is a cyclohexyl group.

38. A metallocene compound according to claim 4, wherein said $C_6$ aryl group is a phenyl group.

39. A metallocene compound according to claim 6, wherein the unsubstituted $C_1$–$C_4$ alkyl group is a methyl group.

40. A metallocene compound according to claim 6, wherein the halogen is chlorine.

41. A metallocene compound according to claim 7, wherein B is a substituted or unsubstituted $C_1$–$C_{10}$ alkylene, a $C_2$–$C_8$ silylene or a $C_1$–$C_{10}$ alkylene-$C_2$–$C_8$ silylene.

42. A metallocene compound according to claim 7, wherein B is ethylene or dimethyl silylene.

43. A metallocene compound according to claim 8, wherein B is a bridge of the structure —(ER'$_2$)p-Z-, wherein each E is independently a carbon, a silicon or a germanium, Z is —NR$^-$—, —PR"—, —O— or —S—, each $R^1$ being independently a hydrogen, each R and R" being independently a substituted or unsubstituted $C_1$–$C_1$o hydrocarbyl and said —(ER'$_2$)— end being bound to $C_{10}$ said —Z— end being bound to M.

44. A metallocene compound according to claim 43, wherein E is —NR$^-$—.

45. A metallocene compound according to claim 19, wherein the alkyl alumoxane is methyl aluminoxane.

46. A method according to claim 33, wherein the aluminum compound is an alkyl aluminoxane.

47. A method according to claim 33, wherein the aluminium compound is methyl aluminoxane.

48. A method for the polymerization of ethylenically unsaturated monomers comprising contacting the monomer with the metallocene compound prepared according to claim 26.

* * * * *